June 16, 1936.  C. B. HASFORD ET AL  2,044,298
COUPLING
Filed April 26, 1934
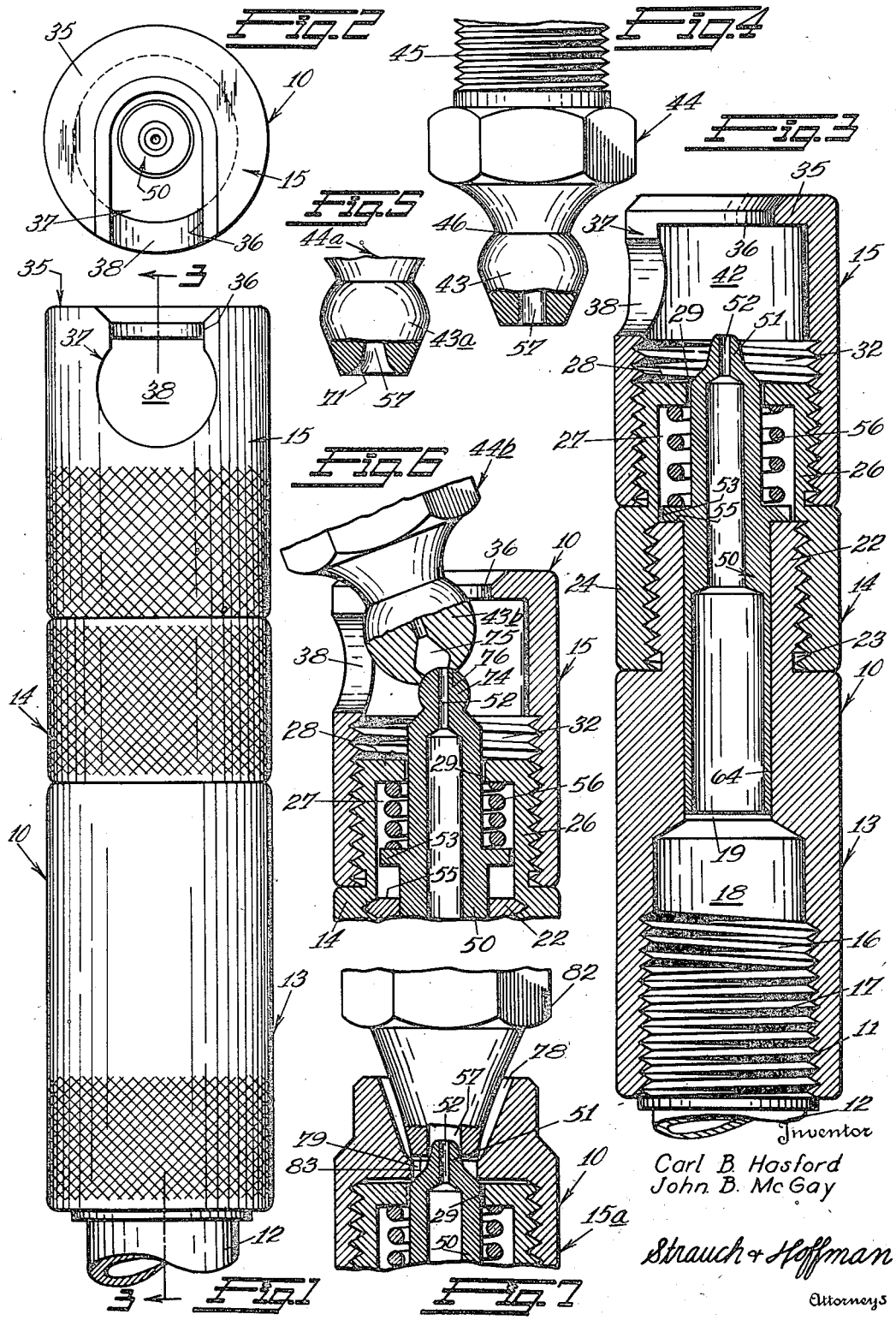
Inventor
Carl B. Hasford
John B. McGay
Strauch + Hoffman
Attorneys Patented June 16, 1936

2,044,298

UNITED STATES PATENT OFFICE 2,044,298

COUPLING

Carl B. Hasford, Dallas, Tex., and John B. McGay, Tulsa, Okla.

Application April 26, 1934, Serial No. 722,552

1 Claim. (Cl. 285—143)

The present invention relates to a coupler adapted to conveniently establish a tight connection between a fluid line and a nipple or the like.

More specifically, the present invention relates to a detachable coupling designed for association with a fluid line of the type utilized in supplying grease under pressure to the bearings and joints of automotive vehicles.

Several types of couplings and grease connections are in common use on the present day automotive vehicles but they are not entirely efficient as some of the grease escapes through the joint between the nipple carried by the vehicle and the connector carried by the conduit of the grease systems. A further undesirable feature present in quick-couplings of the prior art resides in the great difficulty with which the service station attendant is able to retain the grease gun connector in operative relation to the chassis fittings as the grease is delivered under high pressure. This is especially true of connectors of the push-on type which tend to back away from the fitting under pressure, particularly when applied to certain types of spring shackles and the like in which great resistance to grease entry is encountered.

It is therefore a primary object of the present invention to provide a coupling that affords a readily attachable but leak proof connection with the fitting on the vehicle.

A further major object of the present invention is to provide a coupler for use in connecting a grease line to a nipple on a vehicle or other machine part with means for utilizing the pressure of the grease to maintain the grease line coupler in sealing engagement and, preferably, in interlocked relation also, with respect to the nipple.

Another object of the present invention resides in the establishment of a coupling which fits loosely when the initial connection is made, but which then automatically produces tight sealing engagement as the grease is delivered.

A still further object of the present invention resides in the provision of a coupler having a formation adapted to laterally receive the head of a nipple and form a tight seal therewith upon the delivery of the grease.

Another object of the present invention resides in the provision of a coupling permitting the member carried by the grease line to be disposed at a substantial angle with respect to the passage in the receiving fitting.

A further object of the present invention is to provide a coupling for use in supplying grease under pressure to shackles, joints and the like, wherein the entire pressure of the grease is concentrated within the receiving passage carried by the shackle or joint fitting.

Another object of the present invention resides in the provision, in a greasing coupling assembly comprising complementally engageable parts having passages designed for intercommunication to establish grease flow, of means for automatically ensuring cooperation of said passages to establish the grease flow.

These objects will be clarified and others will appear from the following specification and appended claim when studied in conjunction with the accompanying drawing wherein;

Figure 1 is an enlarged elevational view of the coupler comprising the present invention when viewed from that side which is provided with a key-hole slot;

Figure 2 is a plan view of the coupler shown in Figure 1;

Figure 3 is a longitudinal sectional view taken on line 3—3 of Figure 1, looking in the direction indicated by the arrows;

Figure 4 is an elevational view, partly in section, of a nipple about to be associated with the key-hole slot of the coupler of Figure 3;

Figure 5 is a view similar to Figure 4 showing a slightly modified form of nipple head;

Figure 6 is a sectional view showing a modified coupling in one of its final grease delivering positions; and Figure 7 is a sectional view of a further modified coupling shown in its final grease delivering association with a modified form of receiving nipple.

With continued reference to the drawing wherein like numerals are used to indicate the same parts throughout the several figures, and with particular reference for the moment to Figures 1 to 4, inclusive, the numeral 10 denotes generally the coupler secured at 11 to the flexible pressure line 12 of a grease gun or pump.

Coupler 10 is preferably made up in three separable sections 13, 14 and 15. Section 13 is internally threaded at 16 to receive a coupling element 17 which is carried in any suitable manner by the discharge end of the pressure line 12. The pressure line discharges into an enlarged bore 18 formed within section 13. Bore 18 merges into a reduced bore 19, the purpose of which will be hereinafter pointed out. Bore 19 extends longitudinally of section 13 and terminates at the opposite end thereof. Section 13 at this end is provided with a reduced threaded portion 22 which is screw threadedly engaged by internally threaded bore 23 of hollow section 14. Section 14 is preferably in the form of a cap having a portion 24 of a diameter equal to the diameter of section 13. Portion 24 is preferably knurled in order that sections 13 and 14 may be conveniently assembled by hand. Section 14 is provided with a reduced threaded end 26 which extends beyond the end of section 13 and forms a chamber 27 of a diameter substantially equal to the outer diameter of the reduced threaded portion 22 of section 13. The transverse wall 28 of cap 14 is suitably apertured at 29 for a purpose to be presently pointed out. Threaded end 26 of section 14 is adapted to be screwed into the internally threaded bore 32 of section 15. Section 15 is knurled in order to permit ready, manual assembly and separation of the sections 14 and 15.

The end wall 35 of section 15 is provided with a lateral slot 36 which forms part of a key-hole slot designated generally by numeral 37. The longitudinal face of section 15 through which slot 36 is cut is provided with an enlarged circular opening 38 which completes the key-hole slot 37. The slots 36 and opening 38, respectively, extend completely into section 15 and communicate with the internal chamber 42 formed by the latter, and the end of section 14.

Section 15 through key-hole slot 37 is adapted to receive head 43 of a grease receiving nipple or fitting 44 (Figure 4) which is secured to the machine part by screw threads 45 or other suitable means. This association of section 15 and nipple 44 is accomplished by aligning head 43 of nipple 44 and opening 38 in section 15, as shown by the positions of Figures 3 and 4, and then moving coupler 10 laterally over head 38. The slot 36 in section 15 is adapted to loosely receive reduced portion 46 of nipple 44 and is of such dimensions that coupler 10 may be slightly moved in a longitudinal direction.

Cap section 15 is of an external diameter equal to that of sections 13 and 14. It will thus be seen that coupler 10 is of equal external diameter and therefore does not present any projecting protuberances that might catch upon parts of the machine being greased and cause annoyance while it is being assembled and disassembled upon the receiving fitting 43.

In order to supply grease from the pressure line to the receiving fitting 43, the coupler 10 is provided with a pressure responsive element which, in the preferred embodiment, comprises a hollow piston, or plunger, 50 which is slidably received with a close fit in passage 19 of section 13. Piston 50 projects from the end of section 13 through aperture 29 in section 14. The outer end of piston 50 is provided with a rounded, or substantially conical, injection needle or tip 51, which is provided with a restricted discharge passage 52. Piston 50 is also provided with an annular flange 53 which is mounted in the chamber 27 and adapted to be yieldingly retained in abutting engagement with the end face 55 of section 13 by a coil spring 56 which surrounds piston 50 and contacts flange 53 at one end and wall 28 of section 14 at the other end.

When the grease is placed under pressure in the coupler, the plunger 50 will be driven forwardly, since the restriction to grease flow through passage 52 will cause a sudden and sufficient build-up of pressure behind the plunger to overcome the resistance of the spring 56. The needle 51 will thus be moved into the passage 57 in nipple 43. Due to the shape of needle 51 a circular line seal is provided with the wall of passage 57, and no grease can escape between nipple 43 and needle 51.

The only other place where a seal is required, to insure proper forward movement of piston 50 and to prevent leakage during operation, is between the wall of passage 19 and the body of the piston. In the present invention, this seal is obtained by providing the piston with an extension 64 of relatively thin cross section so that the grease under pressure within piston 50 causes the relatively thin wall to be forced radially outwardly into sealing contact with passage 19.

As the needle 51 assumes a firm seat in the nipple opening, there will be an immediate tendency for the entire coupler to back away from the nipple, but any such movement is limited by engagement of the nipple head with the edges of the slot 36. Thus the head 43 of nipple 44 will be clamped tightly between the head of the cap 15 and the piston, thereby insuring a rigid connection of the coupling. Due to this feature of the invention, it will be clear that, as the pressure in the line is increased or diminished, the interlocking and sealing engagement of the coupling is proportionately increased or diminished.

The feature, of projecting the needle tip 51 into the receiving passage 57, is important since by this novel construction it is impossible for the grease either to escape or to react between the fitting and the coupler to cause the coupler to back off and thus break the connection and allow leakage of the grease at the connection. That is to say, the reaction area for back pressure can never exceed the total effective piston area on which the forward pressure acts, whereas, if the coupler were made to conform to the outer surface of the nipple head, as in certain prior types of connections, a film of grease might expand outwardly over the head to create an excessive back pressure area.

After the shackle or other joint has been properly lubricated, the coupling connection may be broken merely by closing the valve provided in the pressure line or gun to control the dynamic pressure. The closing of the control valve usually leaves the coupler and pressure line filled with grease under a static pressure, the value of which will depend upon the resistance to passage of grease through the lubricated joint. Ordinarily, the coil spring 56 is of sufficient strength to return the piston to its inoperative position, in which it is shown in Figure 3. If, due to excessive resistance in the lubricated joint, the spring 56 is not sufficient to return the piston to its inoperative position, the attendant may grasp the coupler and push it toward the receiving nipple and thus positively aid the spring in returning the piston. After the piston has been returned to its inoperative position, the coupler may be readily disengaged from the receiving nipple 44.

In Figure 5, there is shown a modified form of nipple, 44a, provided with a head 43a. The passage 57 of nipple 44a, however, is provided with an outwardly flaring end wall 71, which is adapted to guide the end 51 of piston 50 into passage 57, should the piston 50 not be in registering relation with the passage 57. The operation of the nipple and coupler is otherwise substantially the same as that previously described.

In Figure 6, there is shown a modified form of the invention wherein the coupler may be disposed at a substantial angle to the axial center line of the nipple during the delivery of the grease. The only difference in the coupling disclosed in this figure is that the piston 50 is provided with a ball-shaped tip 74 and the nipple 44b is provided with a ball-shaped head 43b which is provided with a conical recess 75 terminating in a spherical seat 76 for the ball tip 74. These complemental shapes of the piston tip and nipple head 43b permit the attendant to grease a nipple located at a point which would prevent the axial alignment of the coupler while the coupler is disposed at an angle as clearly shown in Figure 6.

The recess 75 is broad enough to communicate with the passage 52 when the two are relatively inclined at an appreciable angle; and the universal relationship of the tip 74 and seat 76 will cause the former to automatically seek a good seat on the latter under pressure. The edges of slot 36 cooperate with the upper surface of the ball 43b to obtain interlocked adjustment to various angular positions. The operation of the coupler in the present modification is otherwise the same as that heretofore described.

In Figure 7, there is shown a modified form of the present invention which is adapted to be used with a type of nipple now in use on many automobiles. In this form of the invention, the coupler 10 is provided with a modified end section 15a. Section 15a is provided with a cup-shaped guideway 78, and a central aperture 79 in alignment with the aperture 29 in section 14. The end 51 of piston 50 is adapted to be projected freely through aperture 79 and be received in passage 57 of nipple 82 in the same manner as that described in connection with Figure 3. In this form of the invention, however, there is no interlock, and the attendant must push the coupler on with sufficient force to maintain the seal.

It will be appreciated that, since the relatively great area of end face 83 of the nipple would cause considerable back pressure upon the coupler if the latter were designed to receive the nipple instead of to be projected thereinto, the elimination of this back pressure makes it possible for much more efficient lubrication of joints even though the interlock of the other embodiments of the present invention is not obtained. It has been found that, by using the present form of the invention, the attendant is able to force grease through a "frozen" joint which he could not "break" with the coupling devices now in common use.

As previously pointed out, the preferred embodiment of the present invention is composed of more than one, and preferably three, separable sections. This separable feature permits the use of the same pressure gun to lubricate machines embodying different type nipples without removing the entire coupler from the grease line. As an example, the coupler shown in Figure 3 may be readily converted into the type shown in Figure 7, since the sections 15 and 15a are easily interchangeable.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A coupler designed to supply grease to a fitting secured on a machine part comprising a cap having a key-hole slot and a chamber designed to freely receive a portion of said fitting, a second cap having a chamber and a central aperture in its end wall threaded into said first mentioned cap, a hollow, elongated body member threaded into said second cap and designed to have grease supplied thereto under pressure, a hollow grease supply piston slidably disposed for longitudinal movement in said body member, a needle tip provided on the end of said piston and designed to project into one end of the chamber in said first cap in spaced relation to the walls of said keyhole slot, a spring surrounding a portion of said piston and having one end engaging the end wall of said second cap, means on said piston upon which the other end of said spring engages whereby said piston is yieldingly retained in its retracted position and the needle tip is retained in said end of said chamber, and means in said piston, comprising inwardly directed landings, designed to have the grease pressure act thereon for advancing said needle tip against the resistance of said spring from its normally uncoupled position to its coupled position in sealing engagement with said fitting, said spring acting to return said piston and tip to their normal inoperative position when the grease pressure is removed.

CARL B. HASFORD.
JOHN B. McGAY.